May 21, 1963   R. W. JOHNSON ETAL   3,090,182
MACHINE AND METHOD FOR PELLETIZING FIELD CURED HAY
Filed March 23, 1959   4 Sheets-Sheet 3
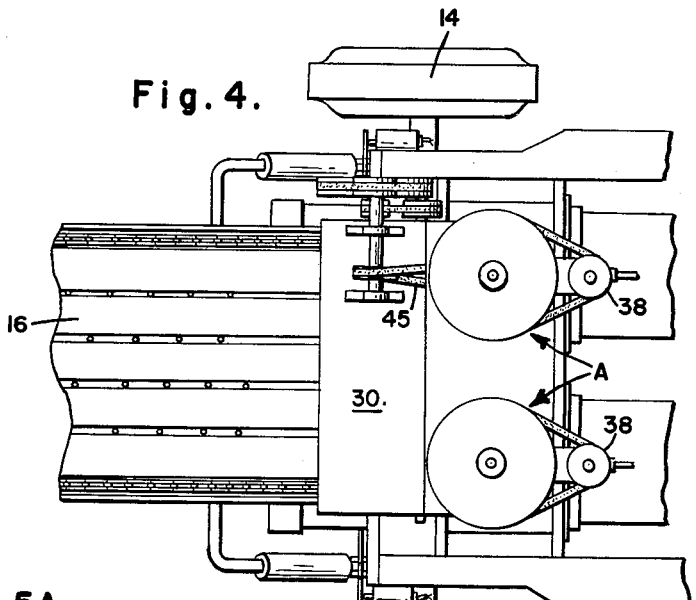
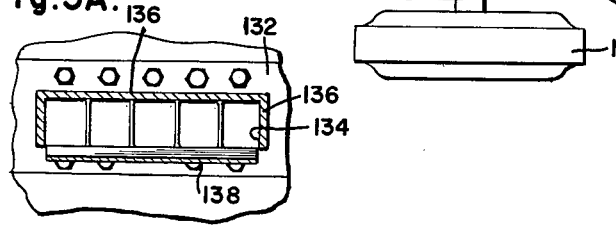
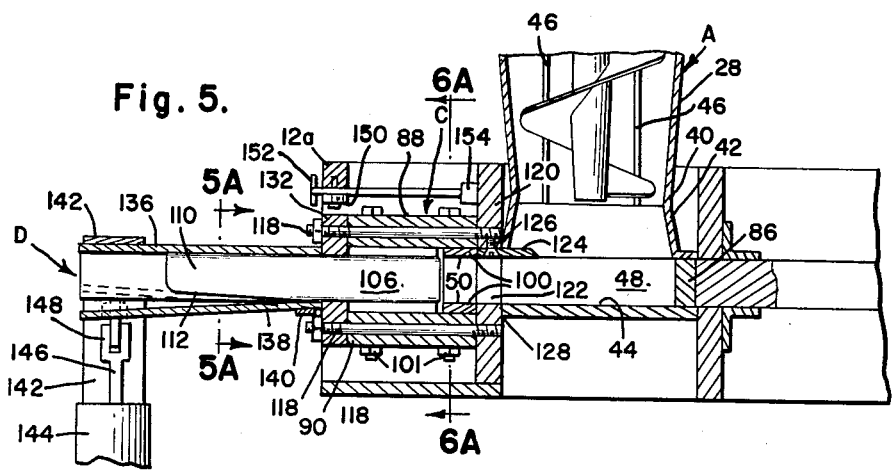
INVENTORS
Roy W. Johnson
BY Donald R. Vaughan
Townsend and Townsend
attorneys May 21, 1963  R. W. JOHNSON ETAL  3,090,182
MACHINE AND METHOD FOR PELLETIZING FIELD CURED HAY
Filed March 23, 1959  4 Sheets-Sheet 4

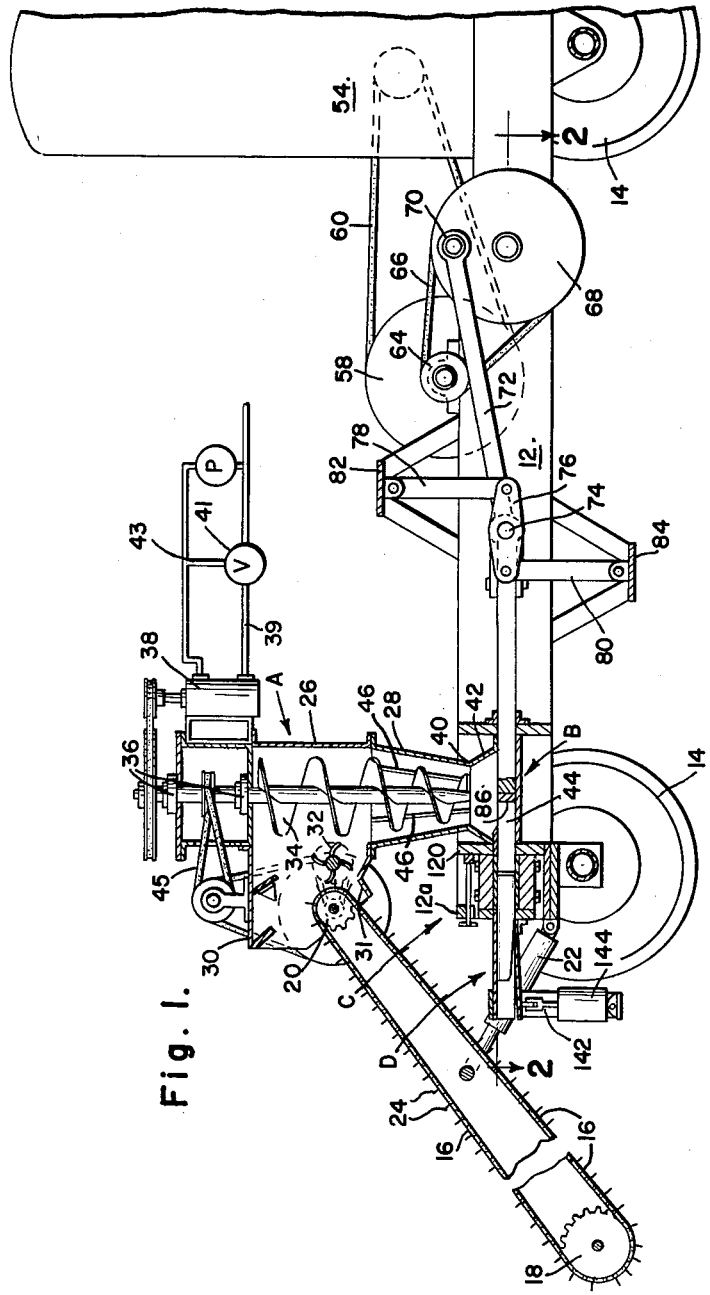

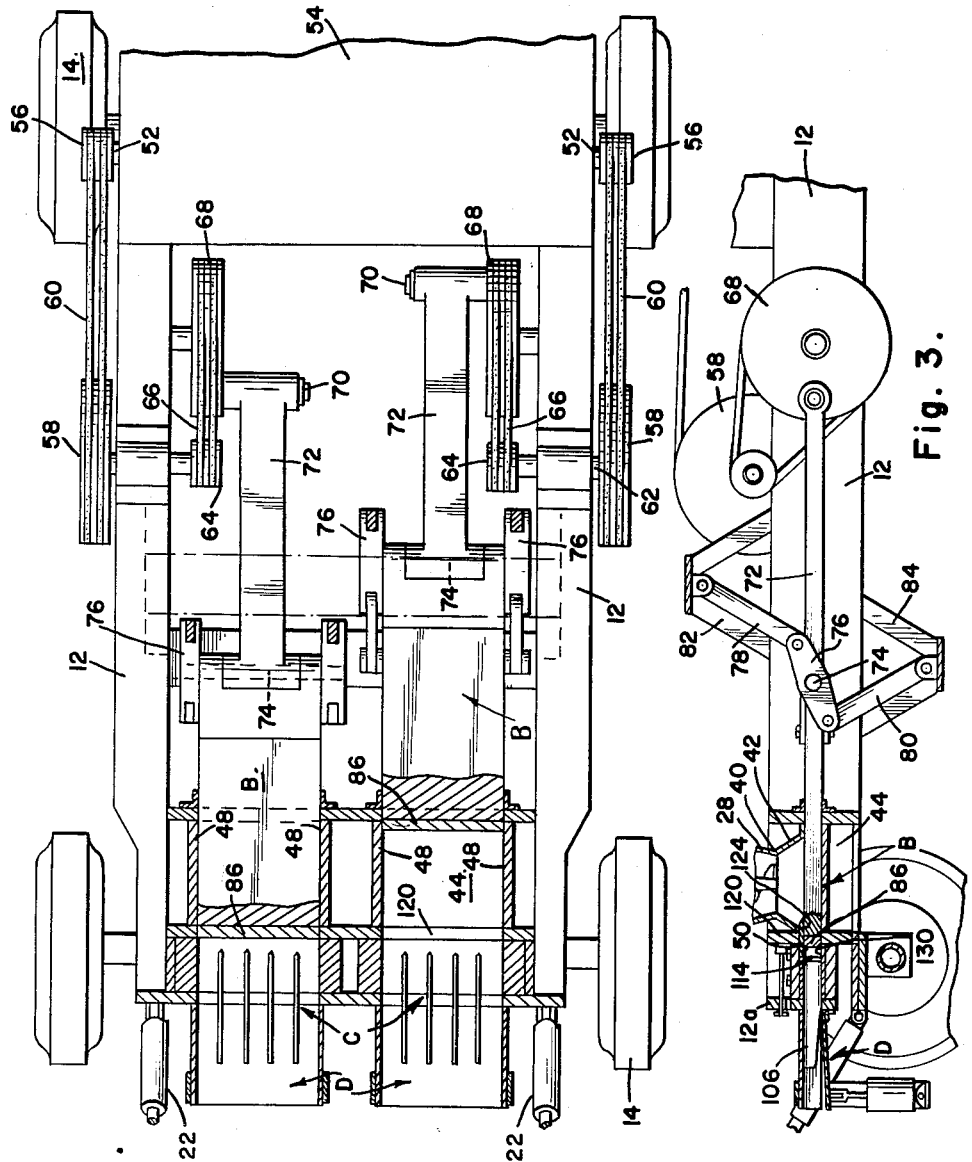

INVENTORS
Roy W. Johnson
Donald R. Vaughan
BY
Townsend and Townsend
attorneys

United States Patent Office 3,090,182
Patented May 21, 1963

3,090,182
MACHINE AND METHOD FOR PELLETIZING
FIELD CURED HAY
Roy W. Johnson and Donald R. Vaughan, Woodland,
Calif., assignors to Cal-Cube, Inc., Woodland, Calif.,
a corporation of California
Filed Mar. 23, 1959, Ser. No. 801,253
17 Claims. (Cl. 56—1)

This invention relates to new and useful improvements in machines and methods for pelletizing fodder and particularly contemplates a machine and method for pelletizing field-cured hay.

The present invention provides an end product of a small, pelletized fodder wherein the hay or other livestock feed has not been ground or chopped and accordingly the natural long fiber is maintained which has proven beneficial both for feeding and digestive purposes. The pellets may be formed of controlled or predetermined density and of an optimum size for purposes of both handling and feeding.

In accordance with the present invention, a mobile unit includes an auger-type feed which initially compresses the hay and provides a positive flow of hay to a ram which forms it into a compressed loaf of hay. Successively formed loaves force previously formed loaves through a die which pelletizes the loaves, and a compression retention chamber communicating with the die maintains the material under compression for a dwell period to form a dense, cohesive, pelletized product.

One object of the present invention is to provide a machine with the above described characteristics.

Another object is to produce a pelletized field-cured hay or other fodder product of predetermined density maintaining the original long fiber of the hay and formed in a convenient mouthful size for livestock.

Still another object resides in the provision of an auger-type feed operating in a housing of diminishing cross-section which provides a positive flow of fodder and which also compresses the fodder within predetermined limits. The housing is provided with vertical ribs which prevent hay from rotating with the auger, facilitating compaction and also preventing retrogression or upward movement of the fodder back to the top of the auger. Retrogression and plugging of the auger is further prevented by a divergent flare at the bottom of the housing.

Another object resides in the method for compacting or compressing the hay whereby it is progressively compressed through the machine to form a dense, cohesive, pelletized end product. First, there is an initial or precompression by the auger-type feed operating in a housing of diminishing cross-section. Further compression is effected by the reciprocating ram which forms successive bites of pre-compressed hay into loaves of predetermined density while delivering the loaves to a head space, or position between the projected stroke of the ram and die cutters. The loaves are then extruded through die cavities and retained under pressure for a dwell period to form a cohesive pellet of dense hay.

Another object resides in the provision of an automatic control for the compression retention chamber at the terminal end of the process and apparatus. The control is automatically operative to prevent excessive and undue compaction of the product which would result in plugging of the machine and bring a stop to the operation as well as producing an undesirably hard pellet.

Still another object resides in the simple knock-down construction of the dies for easy disassembly and reassembly to facilitate maintenance and repair.

Another object of the invention is to form the die with blades of a construction which substantially eliminates plugging of the die with fodder passing through and being formed into pellets.

Still another object resides in the provision of a method and apparatus operable upon hay to pelletize it within a substantially wider range of moisture content than is possible with pelletizing or baling machines presently being used.

Other objects of the present invention will become apparent upon reading the following specification and referring to the accompanying drawings in which similar characters of reference represent corresponding parts in each of the several views.

In the drawings:

FIG. 1 is a side elevation of a preferred embodiment of the present invention showing certain parts in section and partly broken away;

FIG. 2 is a plan view taken substantially on line 2—2 of FIG. 1;

FIG. 3 is a fragmentary side elevation showing the ram in forward projecting position;

FIG. 4 is a fragmentary plan view of a portion of the augers and the conveyor and illustrating the method of driving them;

FIG. 5 is a fragmentary side elevation enlarged relative to FIG. 3 showing the ram in retracted position and illustrating the adjustable compression control within the compression retention chamber;

FIG. 5a is a view taken substantially on line 5a—5a of FIG. 5;

Figure 7:
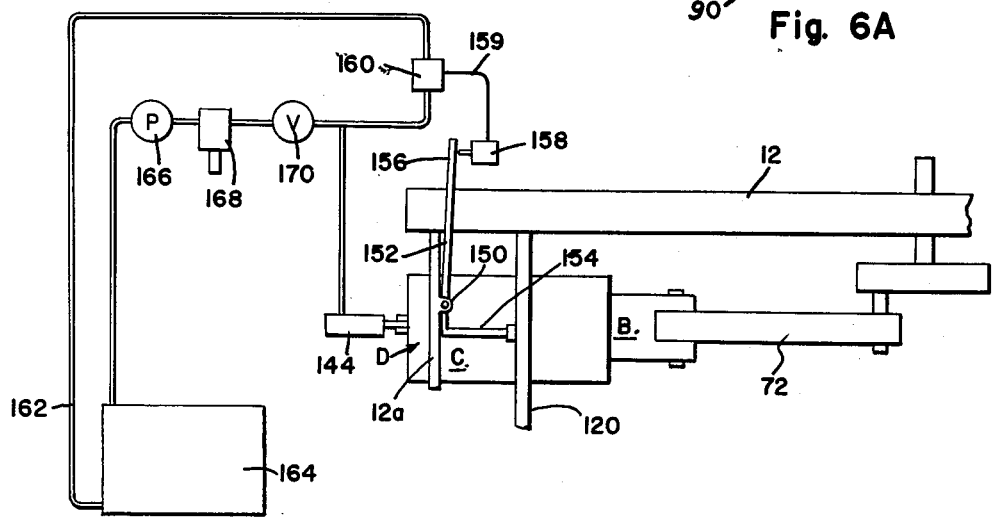

FIG. 7 schematically illustrates the hydraulic circuit and automatic relief for the compression retention chamber.

The drawings illustrate a mobile unit which carries two pelletizing assemblies. Each assembly includes an auger-type feed A, adapted and positioned to deliver the hay partially compressed to a position for further compression by a reciprocating ram B. Ram B compacts and delivers the hay in the form of an initial loaf of compacted hay to a head space between the terminal projection of the ram stroke and a die C where successive bites or loaves of hay force previously formed loaves in the head space into the die. A compression retention chamber D provided on the other side of the die provides a dwell period to complete formation of the pelletized hay.

The mobile unit has been shown to include a frame 12, wheels 14 which are operatively connected to a suitable source of power and a conveyor 16 which is inclined at the forward end of the unit between sprockets 18 and 20. Hydraulic cylinders 22 pivoted between the forward end of the frame and conveyor 16 are connected with suitable controls (not illustrated) for raising and lowering the conveyor to adapt it to the particular terrain. The conveyor may be provided with fingers 24 to facilitate picking up and conveying the hay or other fodder to auger A with which conveyor 16 communicates.

The drawings illustrate the mobile unit as carrying two pelletizing assemblies. The assemblies are identical, except that pitch of the augers and reciprocation of the rams is reversed.

Each auger feed unit A includes a generally cylindrical housing having an upper portion 26 and a tapered lower portion 28. The upper portion 26 includes a forwardly projecting extension 30 formed with an opening 31 which circumscribes upper end 20 of conveyor 16. Fingers 32 are mounted within housing 26 immediately to the rear of the top 20 of conveyor 16 and geared for rotation with sprocket 20 and positioned to transfer hay from conveyor 16 to auger 34. Auger 34 is vertically disposed within upper and lower housings 26 and 28 being journaled in bearings 36 at the top of the housing for rotation by a suitable source of power as has been indicated by hydraulic turbine 38.

The lower section 28 of the housing tapers gradually inwardly converging downwardly from the cylindrical cross section of section 26 as at 40 which has a cross section about one-half the cylindrical cross section of section 26.

The remaining square portion 42 of section 28 continues downwardly a short distance and diverges or flares outwardly to prevent undue compaction of hay being delivered to the ram guide housing 44.

Auger 34 depends only to a point of alignment with the point of minimum cross section as at 40 of the housing.

As appears in FIG. 1, the lower portion of auger 34 tapers to conform with the taper of the housing, the auger at all times having about a one-inch clearance of the housing.

Section 28 has been illustrated as formed with vertical ribs 46 which prevent the feed from being carried around with the auger.

A suitable auger has been constructed wherein the auger is about two feet long, terminates about three inches above the bottom of outward flare 42 with the flaring portion 42 flaring outwardly to have a cross section area about 10% greater than the point of minimum cross section 40. The bottom of portion 42 has a cross section identical with and communicates with housing guide 44 of ram B.

Turbine 38 is provided with an automatic control which slows or stops auger 34 in the event it delivers hay to ram B too fast.

Oil line 39 which comprises part of the circuit for hydraulic turbine 38 of auger feed A is provided with a bypass valve 41. As hay or fodder being fed to chamber 42 by auger 34 becomes excessively compacted, within predetermined limits, pressure required to turn the auger becomes greater than that required to open bypass valve 41 and the incoming oil in line 39 is diverted to bypass line 43 and back through the pump, stopping or substantially slowing auger 34 and accordingly hay intake until ram B has removed excess hay from ram guide housing 44. At that time less pressure is required to operate turbine 38 and the feeding operation of the auger resumes.

Turbine 38 also operates conveyor 16 through belt 45 (FIG. 1) and the conveyor accordingly stops temporarily while ram B is clearing the guide housing.

As appears in FIG. 2, there are two ram guide housings 44 which are identical in all respects, the sides 48 of which serve as guides both for rams B and hay being compacted by the rams and which guide housings 44 communicate with dies C.

Each ram B is rectangular and dimensioned to move slidably along walls 48 of ram guide housing 44 and into the opening 50 (see FIG. 3) of die C.

A drive shaft 52 projects from either side of a source of power such as a diesel engine indicated generally at 54 terminating in wheels 56 which operate second larger wheels 58 by belt 60. Wheels 58 have been illustrated journaled exteriorly of frame 12 on shafts 62. Each shaft 62 projects interiorly of the frame and carries a third wheel 64 which in turn, through belt 66, operates wheels 68. Each wheel 68 carries an eccentric shaft 70 adapted to reciprocate rams B through connecting rods 72.

Ram B and connecting rod 72 are connected by a pin shown in dotted line at 74 in FIG. 2, the pin being journaled in the middle of a pair of rockers 76 disposed on either side of each ram B. Rockers 76, as appears in FIG. 3, are each carried by upper and lower arms 78 and 80, each of the latter being pivoted to an end of the rocker and the other ends of arms 78 and 80 being pivoted respectively to an upper and lower bracket 82 and 84, which brackets are carried by frame 12. Arms 78 and 80 and rocker 76 serve as a support for the rear end of rams B as well as a pivotal connection between each ram and associated connecting rod 72. The pivotal connection of the various arms insures that when one end of rocker arm 76 rises, the other end will descend a similar amount whereby reciprocating movement of pin 74 positioned in the center of rockers 76 will at all times be horizontal.

The front face of each ram is provided with a removable cap of tempered steel 86. Other suitable means may be inserted behind cap 86 for selective protraction of the ram.

Figure 6:
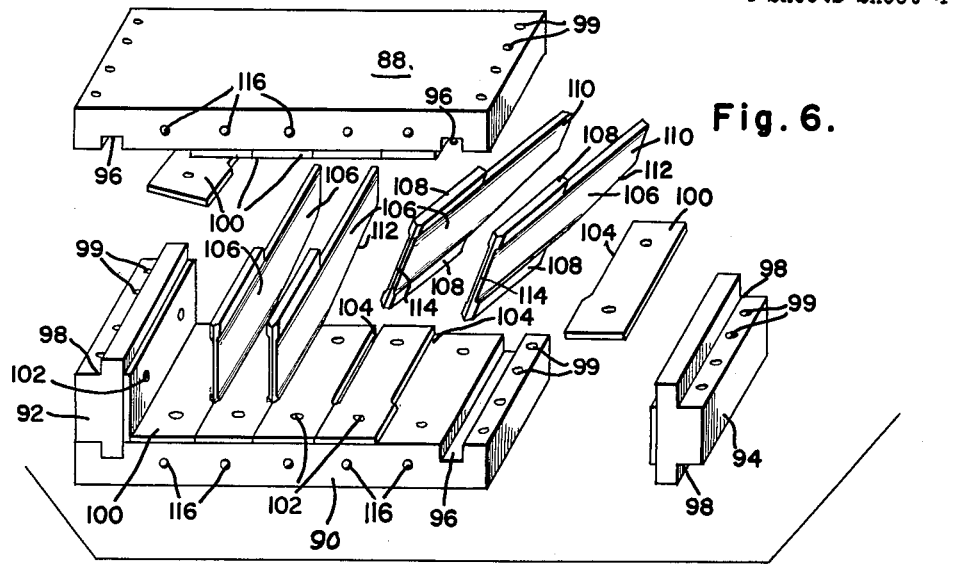
FIG. 6 is an exploded perspective of the die assembly.

Dies C are positioned immediately forward of ram guide housings 44. An exploded perspective of one of the dies appears in FIG. 6.

Dies C are of an easy knock-down construction facilitating repair and replacement of parts. Each die comprises a top 88, bottom 90 and sides 92 and 94. Top and bottom 88 and 90 are each provided on one surface with transverse slots 96 proximate each end of the member, and sides 92 and 94 have been cut out as at 98 whereby when assembled the members are keyed together forming a particularly sturdy but easily disassembled die.

Apertures 99 formed in the ends of top 88 and bottom 90 and transversely through sides 92 and 94 receive bolts 101 (see FIG. 5) securing the various members together.

Wear plates 100 are secured interiorly of the die as by counter-sunk, flat-headed screws 102. The wear plates may be formed of tempered steel to provide a particularly wear-resistant die.

The wear plates have been longitudinally cut out as at 104 to receive and vertically mount divider blades 106.

Divider blades 106 are preferably formed of tempered steel and are elongate members having top and bottom projections 108 extending longitudinally of the knives a distance sufficient to be received in slots 104 of water plates or liners 100. The lower edge of extensions 110 taper upwardly slightly as at 112 to form part of the compression retention assembly D which will be described subsequently.

Figure 6A:
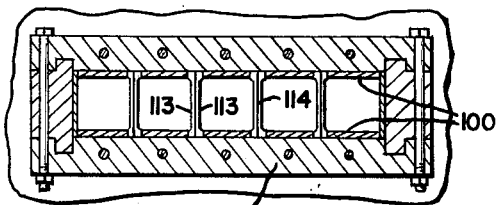
FIG. 6a is a view taken substantially on line 6a—6a of FIG. 5.

Each divider 106 has been longitudinally milled on its sides as at 113 to form a thin central portion relative to thicker projections 108 and to form arcuate or rounded corners in the assembled die, as particularly appears in FIG. 6a. The softened or rounded corners effect a decrease in friction of hay passing through the die as compared with abrupt or square corners and assist in preventing a build-up of hay in the corners and consequent plugging of the die.

The ends of the dividers disposed within the die have been honed to a knife edge as at 114.

Top 88 and bottom 90 of the die are apertured through their width as at 116 to receive bolts 118 (see FIG. 5). Bolts 118 mount the die on a bulkhead 120, the latter being mounted transversely on frame 12 immediately forward of auger unit A and ram guide housing 44. Bulkhead 120 is apertured as at 122 (FIG. 5) and a transversely disposed blade 124 is mounted to project from the top of the aperture as by flat-headed countersunk screws 126 (FIG. 5). Aperture 122 with blade 124 mounted in the aperture registers with the opening 50 defined by die C in conjunction with liners 100.

Bulkhead 120 may be secured as by welding 128 to the bottom of ram guide housing 44.

FIG. 3 illustrates ram B in maximum projected position. It will be observed that in this position the front face or cap 86 of ram B has passed within opening 122 of bulkhead 120 but stops short of knife edges 114 of divider blades 106. This spaced relation, which hereinafter will be referred to as a head space 130, provides an area where compaction is largely effected. The area of the head space may be varied as by insertion or removal of shims between cap 86 and ram B to control density of the end product within selected limits.

The compression retention chamber D is illustrated in FIGS. 5 and 5a. A base plate 132 is apertured as at 134 to register with the die opening when mounted on the die bolts 118. A hood 136 forming the top and sides of the chamber and of the same cross section as the die opening projects outwardly from base plate 132. A vertically swingable plate 138 forms the bottom of chamber D and is hinged as at 140 at the bottom of aperture 134. Hood 136 and swingable plate 138 enclose projections 110 of divider blades 106.

A suitable support such as a yoke 142 carried at the outer or forward end of hood 136 supports a vertical cylinder 144 beneath movable plate 138. A piston 146 is carried by cylinder 144 and attached as at 148 to the under surface of movable plate 138. The cylinder and piston are operable to raise or lower movable plate 138 and to normally maintain the formed pellets under pressure for a dwell period subsequent to formation in die C. As a result of the upwardly inclined bottom edges 112 of projections 110 the cross section within the compression chamber D may be less than the cross section of the die opening, or piston 146 may be lowered to lower movable plate 138 substantially increasing the cross section within chamber D as compared with that of the die.

An hydraulic and electric circuit operable to prevent excessive pressure or compaction in compression chamber D, which could plug the machine, has been schematically illustrated in FIG. 7.

Frame 12, ram B, connecting rod 72, die C, bulkhead or cross-member 120 and compression chamber D have been shown generally. A transverse section 12a of the frame is positioned forward of bulkhead 120.

Transverse section 12a carries a pivot member 150 which pivots lever 152 for horizontal movement near one end of the lever. The end nearest the pivotal connection 150 is connected as at 154 to bulkhead 120. The other end 156 projects laterally for a distance from pivot 150 and terminates proximate a switch 158. Switch 158 through circuit 159 is connected with a solenoid actuated valve 160 which is normally closed.

Valve 160 is located in the return line 162 of a hydraulic circuit which includes a sump or reservoir 164, a pump 166, a pressure control valve 168 and a flow control valve 170.

In operation and as compaction or compression of hay within compression chamber D prevents passage of pellets therethrough the forward stroke of ram B causes bulkhead 120 to spring forward slightly. This movement is magnified by the eccentrically mounted lever 152 causing end 156 of the lever to move rearwards sufficiently to close electrical circuit 159, magnetizing solenoid valve 160, opening the latter, and permitting hydraulic fluid to return through line 162 to the reservoir. This releases pressure on cylinder 144 and plate 138 accordingly lowers relieving pressure within chamber D. Pressure control valve 168 is adjustable to determine pressure within cylinder 144 within predetermined limits. Flow control valve 170 regulates the speed with which the circuit will react and determines the speed of recovery back to set pressure after valve 160 has been opened.

This automatic control system assures a positive flow through the die and the entire machine, and alleviates extreme or excessive pressures which would result in an undesirable hard plug which would stop operations.

Freshly cut hay has a moisture content of about 70% by weight. Baling machines presently being used are normally operative only on hay which has been cured to a moisture content of about 12% to 18% whereas the present invention is operative to pelletize hay having a moisture content of from 6% to about 22%.

When hay having the higher moisture content is used, there appears to be a caramelization of sugars in the end product.

The hay is cut and permitted to cure in the field, as local weather conditions may require, to a moisture content within the specified range of about 6% to 22%. The mobile unit is then caused to traverse the field, drive shaft 52 is started to operate ram B and the pumps operating turbine 38 and accordingly auger unit A, conveyor 16 and cylinder 144 are also started.

Conveyor 16 is adjusted through hydraulic cylinders 22 to a suitable height to pick up hay and deposit it interiorly of housing 26 where auger 34 receives and deposits it in ram guide housing 44 in partially compacted condition.

With the next succeeding forward stroke of ram B, the deposited, partially compressed hay is given an initial impact which forms an initial loaf of compressed or compacted hay, moving it forwardly to head space 130 (FIG. 3).

Blade 124 cuts or shears the upper portion of the hay or loaf to form a loaf corresponding to the size of the die opening 50.

Successive strokes and succeeding bites or loaves force the preceding loaves through the die cavities where they are vertically sheared by cutting edges 114 of divider blades 106. Pellets formed in cubes measuring about 1½ inches on all surfaces have proven an optimum size both for purposes of handling and feeding. It is therefore suggested the die cavities measure about 1½ inches square.

Dividers 106 maintain the pelletized loaves separate through the die and extensions 110 of the dividers further maintain the pelletized loaves separate in compression chamber D.

The radially tapered corners of dividers 106 decrease friction which would occur were the corners squared and assist in preventing plugging of the die.

Movable plate 138 is normally biased upwardly by cylinder 144 to compress the pelletized hay for a dwell period as it is being extruded through the compression chamber, compressing it in an area substantially equal to the cross section of the die in which it was formed.

The outward bottom flare or taper 42 from minimum cross section 40 in auger unit A provides a widened area facilitating movement of the hay through the machine and particularly preventing plugging of auger 34.

In the event auger 34 delivers hay to ram guide housing 44 faster than ram B can take it, the build up of excess hay will resist movement of auger 34 requiring additional hydraulic pressure to drive the auger which, in turn, opens valve 41 to bypass the hydraulic fluid back to the pump and cause turbine 38 to slow or idle in turn slowing or idling auger 34 and conveyor 16.

As pressure within chamber D increases excessively, the impact of ram B against hay in head space 130 will cause bulkhead 120 to move forward slightly, closing circuit 159, activating solenoid valve 160 to open return line 162 to reservoir 164 and decrease the pressure in cylinder 144 which lowers movable plate 138 and permits the pelletized hay to pass more readily and rapidly through the tension chamber and accordingly through the machine.

A pressure exerted by the impact of ram B and movable plate 138 of about 4,000 p.s.i. has been found to produce an end product weighing approximately 35 lbs. per cu. foot which is a desirable density both for purposes of storage and feeding and is approximately three times more dense than an ordinary bale of hay. The pressure is adjustable by valve 168 inasmuch as the particular pressure to be exerted will vary with the amount of head spacing 130 and the amount of moisture in the hay. Moreover, when pressure exerted by plate 138 exceeds about 4,000 p.s.i. the hay will tend to plug in chamber D, and circuit 159 should therefore be adjusted to close when pressure exceeds 4,000 p.s.i.

Although the foregoing invention has been described in some detail for clarity of illustration it will be appreciated certain changes and modifications may be practiced without departing from the spirit of the invention as limited only by the scope of the appended claims.

What is claimed is:

1. A pelletizing machine comprising a ram housing and a ram reciprocable therein, means to reciprocate the ram, a die, said die comprising a plurality of elongate cavities spaced from said reciprocable ram to provide a head space therebetween, said head space forming a compression area in communication with said ram and die, a compression retention chamber comprising an extension of said die cavities and including means to vary the compression on material being pelletized passing therethrough, and means for conveying matter to be pelletized to said guide housing.

2. The combination according to claim 1 wherein the defined die cavities have rounded corners and including means for adjusting the maximum projection of the ram to thereby adjust the dimensions of the head space.

3. A pelletizing machine comprising a ram housing and a ram reciprocable therein, means to reciprocate the ram, a die, said die comprising a plurality of elongate rectangular cavities spaced from said reciprocable ram to provide a head space therebetween, a compression retention chamber comprising an extension of said die cavities and including means to vary the compression on material being pelletized passing therethrough, means for conveying material to be pelletized to said guide housing, and means for adjusting the volume of the head space.

4. A pelletizing machine comprising a ram housing and a ram reciprocable therein, means to reciprocate said ram, a die, a die having a die opening in communication with said ram housing and said ram, at least one elongate divider mounted within said die and formed with a cutting edge, said divider defining a plurality of die cavities, said divider spaced from said reciprocable ram to provide a head space therebetween, a compression retention chamber comprising an extension of said elongate die cavities, and means for conveying material to be pelletized to said guide housing.

5. The combination of claim 4 including means for adjusting the volume of the head space.

6. The combination of claim 5 wherein the defined die cavities have rounded corners.

7. A pelletizing machine comprising a ram housing and a ram reciprocable therein, means to reciprocate the ram, a die, said die having a die opening in communication with said ram housing and ram, a plurality of dividers mounted interiorly of said die and spaced from said ram to provide a head space, said dividers forming a plurality of elongate die cavities, a compression retention chamber comprising extension of said dividers to define a plurality of compression retention cavities, first means for adjusting the size of the compression retention cavities, second means associated with said first means and operable to relieve compression upon material being pelletized passing therethrough when a predetermined amount of resistance has been reached, and means for conveying material to be pelletized to said guide housing.

8. A pelletizing machine according to claim 4 wherein the elongate die cavities are rectangular in section and means is provided to vary the compression upon material being pelletized passing through said compression retention chamber and including a lever pivoted proximate one end of said frame and defining a short end and a long end, said short end being connected to said die, and an electrical circuit associated with the long end of said lever and closable thereby, said circuit being operatively connected with said second means to increase the area of said rectangular cavities in said compression retention chamber when said circuit is closed.

9. A combination according to claim 8 wherein means is provided to adjust the volume of the head space.

10. A pelletizing machine comprising a ram housing and a ram reciprocable therein, means to reciprocate the ram, said ram having a detachable face, a die, said die comprising a plurality of elongate cavities spaced from said ram to provide a head space therebetween, means comprising shims for insertion between the ram and detachable face in order to vary the volume of said head space.

11. A pelletizing machine comprising a mobile unit including a conveyor positioned at one end of said unit and means for adjustment to adapt the same to terrain over which the mobile unit is adapted to travel, an auger type feed unit including a housing communicating with said conveyor, an auger mounted for rotation interiorly of said auger housing and means for rotating said auger, a ram housing and a ram reciprocable therein, means to reciprocate said ram, a die in communication with said ram housing and said ram, at least one divider mounted within said die opening to provide a plurality of elongate die cavities spaced from said ram to provide a head space therebetween, said auger housing communicating with said ram housing adjacent said head space, a compression retention chamber in communication with said die cavities, and means to vary the compression upon material being pelletized passing through said compression retention chamber.

12. The combination of claim 11 wherein the interior of said auger housing is formed with a plurality of spaced, longitudinal ribs.

13. The combination of claim 11 wherein the means for driving said auger includes means operable to limit rotation of said auger when hay carried by said auger causes resistance to rotation of the auger beyond a predetermined amount.

14. The combination according to claim 11 wherein said means to vary compression in the compression retention chamber includes said divider extended into said compression retention chamber to form an extension of said elongate die cavities, the portion of said divider within said compression retention chamber being longitudinally divergently tapered on one edge thereof, the side of said compression retention chamber adjacent said edge being movable relative thereto, and means for moving said movable side of said compression retention chamber including control means associated with said die automatically operable to space said movable side from said tapered edge of said divider when matter resists passage through said die assembly and compression retention chamber sufficient for the impact of said ram to cause movement of said die assembly beyond a predetermined amount.

15. Pelletizing apparatus comprising the combination of a ram housing and a ram reciprocable therein, means to reciprocate the ram, a die housing connected at one end to said ram housing, said die housing having at least one elongate divider to form a plurality of elongate cavities spaced from said ram to form a head space therebetween, said head space forming a compression area in communication with said ram, means to maintain compression upon material being pelletized after passage through said die cavities, and means for conveying material to be pelletized to said guide housing.

16. Apparatus in accordance with claim 15 and wherein said means to maintain compression upon material after passage through said die cavities includes a compression retention chamber comprising an extension of said die housing and said plurality of die cavities and means for varying the size of said extended cavities in said compression retention chamber.

17. Apparatus in accordance with claim 15 wherein a tapered feed housing is provided in communication with said guide housing adjacent said head space, and an auger mounted for rotation interiorly of said feed housing to positively convey material to be pelletized to said guide housing under initial compression.

(References on following page)

References Cited in the file of this patent

UNITED STATES PATENTS

| | | |
|---|---|---|
| 5,981 | Page | July 21, 1874 |
| 197,597 | Brown | Nov. 27, 1877 |
| 808,795 | White | Jan. 2, 1906 |
| 918,525 | Fowler | Apr. 20, 1909 |
| 1,960,548 | Pfeiffer | May 29, 1934 |
| 2,223,904 | Zentz | Dec. 3, 1940 |
| 2,296,516 | Goss | Sept. 22, 1942 |
| 2,685,517 | Dunmire | Aug. 3, 1954 |
| 2,716,317 | McClellan | Aug. 30, 1955 |
| 2,716,318 | Skromme | Aug. 30, 1955 |

FOREIGN PATENTS

| | | |
|---|---|---|
| 66,975 | Austria | Nov. 10, 1914 |